United States Patent
Harter, Jr. et al.

(10) Patent No.: US 6,961,006 B2
(45) Date of Patent: Nov. 1, 2005

(54) OBJECT DETECTION FOR A STOPPED VEHICLE

(75) Inventors: Joseph E. Harter, Jr., Kokomo, IN (US); Robert J Myers, Russia Ville, IN (US); Adil Ansari, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 79 days.

(21) Appl. No.: 10/407,507

(22) Filed: Apr. 5, 2003

(65) Prior Publication Data

US 2004/0196146 A1 Oct. 7, 2004

(51) Int. Cl.$^7$ ............................................. G08G 1/16
(52) U.S. Cl. ...................... 340/903; 340/904; 340/436
(58) Field of Search ..................... 340/426.24, 426.26, 340/435, 436, 545.3, 565, 903, 933, 935, 939, 942; 342/70, 71, 128

(56) References Cited

U.S. PATENT DOCUMENTS

| | | | | |
|---|---|---|---|---|
| 4,470,543 A | * | 9/1984 | Gray et al. ................. | 238/341 |
| 4,901,083 A | | 2/1990 | May et al. .................. | 342/128 |
| 5,598,164 A | * | 1/1997 | Reppas et al. ............... | 342/70 |
| 5,668,539 A | * | 9/1997 | Patchell ..................... | 340/903 |
| 6,151,539 A | * | 11/2000 | Bergholz et al. ............. | 701/25 |
| 6,411,328 B1 | * | 6/2002 | Franke et al. ............... | 348/149 |
| 6,434,486 B1 | | 8/2002 | Studt et al. ................. | 340/435 |
| 6,456,230 B2 | | 9/2002 | Schwartz et al. ............. | 342/71 |
| 6,470,273 B2 | | 10/2002 | Halsted et al. .............. | 701/301 |
| 6,581,006 B2 | | 6/2003 | Cazzell et al. ............ | 340/425.5 |
| 6,642,838 B1 | * | 11/2003 | Barnas et al. ............ | 340/425.5 |
| 6,700,124 B1 | * | 3/2004 | Mekata et al. .............. | 250/351 |
| 6,768,420 B2 | * | 7/2004 | McCarthy et al. ........ | 340/573.1 |
| 2002/0126002 A1 | | 9/2002 | Patchell ..................... | 340/436 |

OTHER PUBLICATIONS

"Research on Vehicle–Based Driver Status/Performance Monitoring; Development, Validation, and Refinement of Algorithms for Detection of Driver Drowsiness," U.S. Department of Transportation, National Highway Traffic Safety Administration, Dec. 1994.

* cited by examiner

*Primary Examiner*—Van T. Trieu
(74) *Attorney, Agent, or Firm*—Stefan V. Chmielewski

(57) ABSTRACT

A detection system and method of detecting the presence of a heat-emitting object near a stopped host vehicle are provided. The detection system includes a thermal detector mounted on the host vehicle for detecting thermal radiation in a coverage zone, such as a blind spot zone. A sensor detects if the host vehicle is stopped. A controller monitors temperature of the coverage zone while the vehicle is stopped and determines the presence of an object in the coverage zone based on a change in temperature.

20 Claims, 2 Drawing Sheets

OBJECT DETECTION FOR A STOPPED VEHICLE

TECHNICAL FIELD

The present invention generally relates to object detection systems and, more particularly, to the detection of thermal emitting object(s) relative to a host vehicle, such as a vehicle in a host vehicle blind spot.

BACKGROUND OF THE INVENTION

Automotive vehicles are increasingly being equipped with collision warning systems that warn the driver of the vehicle of objects that pose an obstruction to the vehicle. Collision warning systems typically include one or more sensors, such as radar sensors and cameras, for sensing the presence of an object in a coverage zone, usually forward or rearward of the host vehicle. While vehicles are typically equipped with side view mirrors for viewing a portion of the side of the vehicle, it should be appreciated that many vehicles exhibit an unviewable area which is commonly referred to as a blind spot. In addition to sensing objects forward and rearward of the vehicle, it is also desirable to sense objects that may be located proximate the side of the host vehicle, particularly in the blind spot, to warn the driver of any obstructions, especially when changing lanes.

A number of detection systems have been proposed for detecting objects in a vehicle blind spot. Many of the proposed side detection systems employ various types of sensors for detecting an object and alerting the driver of the host vehicle of the presence of an object in the blind spot. Examples of proposed detection systems for detecting objects in a blind spot of a vehicle are disclosed in U.S. Pat. No. 5,668,539 and U.S. Patent Publication No. 20020126002, both of which are hereby incorporated herein by reference. The approaches disclosed in the aforementioned patent documents generally employ a plurality of infrared sensors, such as thermopile sensors, to detect changes in a thermal scene along the side of a host vehicle to detect the presence of a thermal emitting object, such as another automobile, in the blind spot of the host vehicle. These prior techniques employ identical sensors positioned at predetermined locations along the side of the host vehicle such that the forward-most sensor is aimed in a particular direction to receive a thermal image from a specific area, and a second sensor is located further aft of the host vehicle and is positioned to view the same area, some predetermined time period after the first sensor as the host vehicle moves forward. By knowing speed of the host vehicle, a microcontroller determines the amount of time shift that is necessary to have data from the same physical area of two different points in time. If there is a temperature increase in the second thermal image, then it is assumed to be heat emitted from a vehicle. The heat could be heat reflected from the road from under the vehicle or heat generated at the interface of the road and tires of the vehicle.

While the aforementioned approaches provide a means to detect heat-emitting objects in a blind spot of the host vehicle, such approaches generally do not adequately detect such objects while the host vehicle is stopped. Thus, in a multi-lane roadway, if another vehicle moves into the blind spot of the host vehicle while the host vehicle is stopped, these prior approaches may not detect the object vehicle in the blind spot of the host vehicle. It is therefore desirable to provide for a detection system for detecting a heat-emitting object relative to the host vehicle when the host vehicle is stopped.

SUMMARY OF THE INVENTION

In accordance with the teachings of the present invention, a detection system and method of detecting a heat-emitting object near a host vehicle are provided. According to one aspect of the present invention, the detection system includes a thermal detector mounted on a vehicle for detecting thermal temperature in a coverage zone, a motion sensor for detecting if the vehicle is stopped, and a controller for monitoring temperature in the coverage zone of the thermal detector while the vehicle is stopped. The controller determines the presence of an object in the coverage zone based on a change in monitored temperature while the vehicle is stopped.

According to another aspect of the present invention, the method of detecting a heat-emitting object near a host vehicle is provided. The method includes providing a thermal detector on a vehicle for detecting thermal radiation in a coverage zone, sensing when the vehicle is stopped, detecting a first temperature in the coverage zone when the vehicle is stopped, and detecting a second temperature subsequent to the first temperature detection in the coverage zone while the vehicle is stopped. The method also includes the steps of comparing the first and second temperatures, and determining the presence of a thermal emitting object based on the comparison.

Accordingly, the detection system and method of detecting a heat-emitting object near a host vehicle advantageously detects one or more objects when the host vehicle is stopped. The system and method is particularly useful for detecting objects in a blind spot of the host vehicle.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
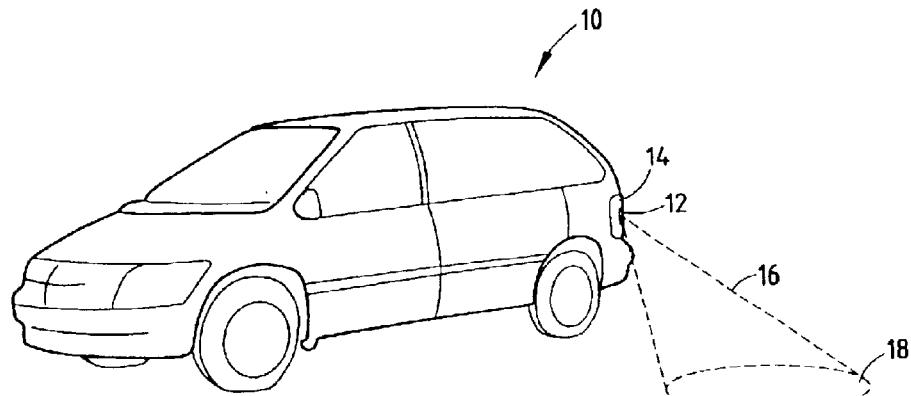
FIG. 1 is a perspective view of a host vehicle employing an object detection system according to the present invention.

Referring to FIG. 1, a host vehicle 10, such as an automobile, is generally illustrated having an object detection system including a thermal detector 12 mounted on the host vehicle 10 and configured to cover a desired field of view referred to as coverage zone 16. In the embodiment shown, the thermal detector 12 is located within the rear tail lamp assembly 14 of the host vehicle 10. However, it should be appreciated that the thermal detector 12 may be located at various other locations onboard the host vehicle 10 to sense thermal energy (temperature) in coverage zone 16. For example, the thermal detector 12 could be located in a side body panel or an exterior rearview mirror housing on the host vehicle 10. The coverage zone 16 extends onto a target area 18 of the ground surface, such as the roadway. It should be appreciated that the thermal detector 12 detects thermal energy (heat) by detecting temperature in the coverage zone 16 including the target area 18. Thermal energy may be generated and emitted by another vehicle and may include thermal energy generated by the other vehicle engine, which may be reflected toward the roadway, and thermal energy generated at the tire/road interface of the other vehicle. Thermal energy could also be emitted from a person or other heat-emitting objects. In the embodiment shown, the thermal detector 12 senses thermal energy temperature in target area 18 located toward the side of the host vehicle 10 which includes a typical blind spot of the host vehicle 10.

The thermal detector 12 may include any of a number of known sensors for detecting thermal energy in a coverage zone. According to one embodiment, the thermal detector 12 includes an infrared (IR) sensor employing a thermopile sensor for sensing temperature in a coverage zone. One example of a commercially available thermal detector is the MLX90601 infrared thermometer module, which is commercially available from Melexis Microelectronic Integrated Systems. More specifically, the thermal detector may include Model No. MLX90601 EZA-CAA commercially available from Melexis Microelectronics Integrated Systems. The aforementioned infrared thermometer module employs a thermopile sensor as the infrared sensing element for recording remote temperature measurements and includes signal conditioning, linearization, and ambient temperature compensation.

Figure 2:
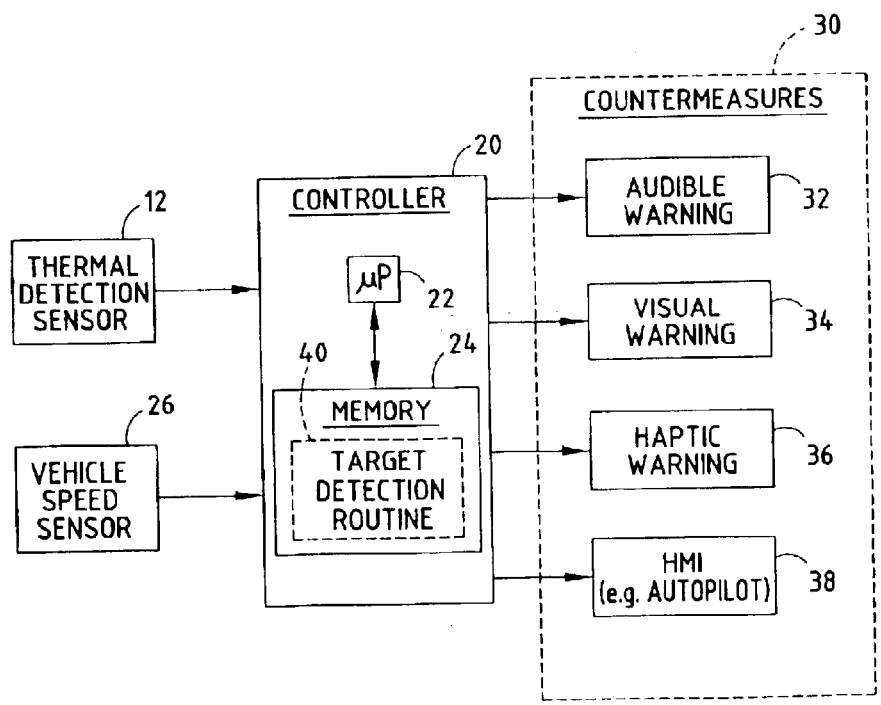
FIG. 2 is a block diagram illustrating the object detection system.

Referring to FIG. 2, the object detection system is generally shown including a controller 20 for processing outputs of the thermal detection sensor 12 and a vehicle speed sensor 26 and generating output(s) for any of a number of countermeasures 30. The controller 20 may include a controller dedicated to target detection, or may include a shared controller, such as a body controller of the host vehicle 10. The controller 20 includes a microprocessor 22 and memory 24. The microprocessor 22 may include a conventional microprocessor having the capability for processing algorithms and data as described herein. Memory 24 may include read-only memory (ROM), random access memory (RAM), flash memory, and other commercially available volatile and non-volatile memory devices. Stored within memory 24 and processed by microprocessor 22 is a target detection routine 40 for detecting an object and initiating any countermeasures as described herein.

The controller 20 monitors the temperature of the coverage zone as sensed by the thermal detection sensor 12 and determines the presence of an object in the coverage zone based on a change in monitored temperature when the vehicle is stopped. In order to determine if the vehicle 10 is stopped, the controller 20 monitors a motion sensor, such as the vehicle speed sensor 26. The controller 20 determines that the vehicle 10 is stopped when the vehicle 10 speed approaches zero miles per hour. While a vehicle speed sensor 26 is shown and described herein for providing an indication of whether the vehicle 10 is stopped, it should be appreciated that other motion sensing devices may be employed to provide an indication of whether the vehicle 10 is stopped, without departing from the teachings of the present invention. For example, the motion sensor 26 could include a controller that determines the transmission is in park or other sensed conditions indicating that the vehicle 10 is stopped. Vehicle speed and transmission position signals may be acquired from a vehicle data bus.

The countermeasures 30 may include any of a number of known countermeasures for warning the driver of the host vehicle 10 or providing control functions such as collision avoidance. According to the embodiment shown, the countermeasures 30 include an audible warning 32, a visual warning 34, a haptic warning 36, and a human machine interface (HMI) 38. The audible warning 32 may include an audio alert sound or a message transmitted from an audio transmitter, such as an audio speaker. The visual warning 34 may include any of a number of illuminated warnings such as indicator lights and messages which may be presented to the driver via LEDs and displays. The haptic warning 36 may include actively vibrating the driver's seat or other haptic warning functions. The HMI 38 may include a collision avoidance signal and any of a number of interfaces including an autopilot having a collision avoidance system, according to one example.

Figure 3:
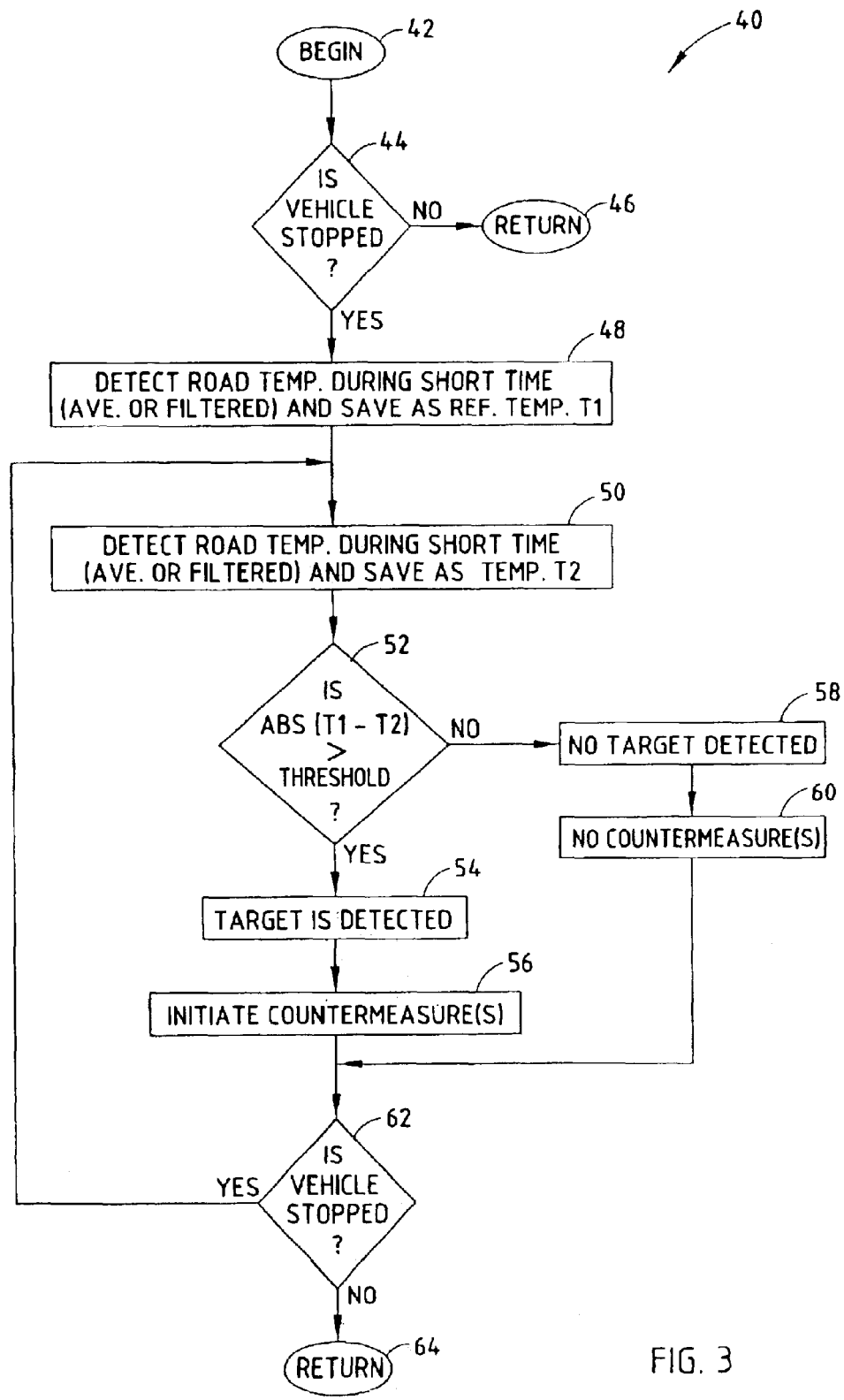
FIG. 3 is a flow diagram illustrating a routine for detecting a heat-emitting object according to the present invention.

Referring to FIG. 3, the target detection routine 40 is illustrated for detecting the presence of a thermal emitting object when the host vehicle is stopped and for initiating any countermeasures responsive to the object detection. Routine 40 begins at step 42 and proceeds to decision step 44 to determine if the host vehicle is stopped. If the host vehicle is not stopped, routine 40 returns in step 46. If the host vehicle is stopped, routine 40 proceeds to step 48 to detect road temperature in the thermal detector coverage zone during a short time period and saves the initial detected road temperature as first or reference temperature T1. The reference road temperature T1 may be an average or filtered temperature value accumulated over the short time period (e.g., 50 milliseconds). The reference temperature T1 serves as a base line temperature of the sensed road temperature condition at the time when the host vehicle is initially determined to be stopped.

Once the reference road temperature T1 is detected, routine 40 proceeds to step 50 to detect the road temperature in the thermal detector coverage zone during a short time period and saves the second road temperature as second road temperature T2. The second road temperature T2 may similarly be an average or filtered temperature value accumulated over a short time period (e.g., 50 milliseconds). It should be appreciated that the second road temperature T2 is taken from the same coverage zone subsequent to the acquisition of the reference road temperature T1.

Following acquisition of the reference road temperature T1 and the second road temperature T2, routine 40 proceeds to decision step 52 to compare the absolute value of the difference between the reference temperature T1 and the second temperature T2. If the absolute value of T1 minus T2 is greater than a predetermined threshold value (e.g., 2° C.), the target detector routine 40 determines that a thermal emitting target object is detected in the coverage zone in step 54. The predetermined threshold value represents a minimum temperature increase consistent with the detection of a heat-emitting object, such as a motor vehicle or a person. When a target object is detected in the coverage zone, routine 40 further initiates any appropriate countermeasures in step 56.

If the absolute value of T1 minus T2 is not greater than the threshold value, target detection routine 40 determines that no target object is detected in step 58, and thereafter no countermeasures are initiated in step 60. Following either of steps 56 or 60, routine 40 again determines whether the host vehicle has remained stopped and, if so, loops back to step 50 to repeat the detection of the second road temperature T2 at the next incremental time period. If the host vehicle is determined to no longer be stopped, target detection routine 40 returns in step 64 to end the routine 40.

As long as the vehicle remains stopped, routine 40 will continue to detect the second road temperature T2 and compare the second road temperature T2 to the reference road temperature T1 to determine if an object is detected. As long as the difference in temperatures T1 and T2 exceeds the threshold value and the vehicle 10 is stopped, the routine 40 will continue with the determination that an object has been detected. If the detected object continues to move through the coverage zone and departs the coverage zone, the monitored second road temperature T2 will return towards the reference road temperature T1 and, hence, routine 40 will no longer detect the object in the coverage zone.

Accordingly, the object detection system and method of the present invention advantageously detects the presence of a thermal emitting object in a coverage zone, such as a blind spot of the host vehicle 10, when the host vehicle 10 is determined to be stopped. It should be appreciated that the detection system and method of the present invention may be employed on a host vehicle 10 having a single thermal detection sensor, or may be employed in connection with a host vehicle having a plurality of thermal detection sensors mounted on the host vehicle 10, such as the sensor arrangements disclosed in either of U.S. Pat. No. 5,668,539 and U.S. Patent Publication No. 20020126002.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. A detection system for use on a vehicle for detecting the presence of an object that emits thermal radiation, said system comprising:
    a thermal detector mounted on a vehicle for detecting thermal temperature in a coverage zone;
    a motion sensor for detecting if the vehicle is stopped; and
    a controller for monitoring the detected temperature of the coverage zone while the vehicle is stopped, wherein the controller determines a reference temperature of the coverage zone and compares the monitored temperature to the reference temperature to determine a change in monitored temperature, and wherein the controller determines the presence of an object in the coverage zone based on the change in monitored temperature while the vehicle is stopped.

2. The system as defined in claim 1, wherein the controller determines the reference temperature upon detecting the vehicle is stopped.

3. The system as defined in claim 1, wherein the controller further generates an output signal to initiate a countermeasure in response to detecting the presence of an object.

4. The system as defined in claim 1, wherein the coverage zone comprises a blind spot of the vehicle.

5. The system as defined in claim 1, wherein the thermal detector comprises an infrared sensor.

6. The system as defined in claim 5, wherein the thermal detector comprises a thermopile sensor.

7. The system as defined in claim 1, wherein the change of temperature is an increase in temperature beyond a predetermined threshold.

8. The system as defined in claim 1, wherein the detector is located in a tail lamp assembly of the vehicle.

9. The system as defined in claim 1, wherein the object comprises another vehicle.

10. The system as defined in claim 1, wherein the motion sensor comprises a speed sensor.

11. A method of detecting the presence of a thermal emitting object in relation to a vehicle, said method comprising the steps of:
    providing a thermal detector on a vehicle for detecting thermal temperature in a coverage zone;
    sensing when the vehicle is stopped;
    detecting a first temperature in the coverage zone when the vehicle is stopped;
    detecting a second temperature subsequent to the first temperature detection in the coverage zone while the vehicle is stopped;
    comparing the first and second temperatures; and
    determining the presence of a thermal emitting object based on the comparison.

12. The method as defined in claim 11, wherein the step of determining the presence of an object comprises determining the presence of a thermal emitting object when the difference in the first and second temperatures exceeds a threshold value.

13. The method as defined in claim 11, wherein the first temperature comprises a reference temperature recorded when the vehicle is initially determined to be stopped.

14. The method as defined in claim 11, wherein the step of detecting the second temperature is repeated and the second temperature is continuously compared to the first temperature.

15. The method as defined in claim 11 further comprising the step of initiating a countermeasure when the presence of an object is detected.

16. The method as defined in claim 11, wherein the step of determining comprises determining the presence of an object in a blind spot of the vehicle.

17. The method as defined in claim 11, wherein the step of sensing when the vehicle is stopped comprises sensing vehicle speed, wherein the vehicle is determined to be stopped when the vehicle speed approaches zero miles per hour.

18. The method as defined in claim 11, wherein the step of providing a detector comprises providing a detector in a rear tail lamp assembly of the vehicle.

19. The method as defined in claim 11, wherein the steps of detecting first and second temperatures are performed using a thermopile sensor.

20. The method as defined in claim 11, wherein the steps of detecting first and second temperatures are performed using an infrared sensor.

* * * * *